United States Patent [19]

Keeney, Jr. et al.

[11] 4,319,315
[45] Mar. 9, 1982

[54] D.C. TO D.C. CONVERTER

[75] Inventors: Marvin F. Keeney, Jr., Springfield, Pa.; William A. Massey, Mt. Holly, N.J.

[73] Assignee: General Electric Company, Philadelphia, Pa.

[21] Appl. No.: 195,582

[22] Filed: Oct. 9, 1980

[51] Int. Cl.³ .......................................... H02M 3/335
[52] U.S. Cl. ....................................... 363/22; 363/56; 363/133
[58] Field of Search ..................... 363/22–26, 363/50, 55–56, 97, 131, 133–134

[56] References Cited

U.S. PATENT DOCUMENTS

| | | | |
|---|---|---|---|
| 3,056,077 | 9/1962 | McCarter | 363/133 |
| 3,235,818 | 2/1966 | Meszaros et al. | 363/22 X |
| 3,467,852 | 9/1969 | Murray et al. | 363/134 |
| 3,748,536 | 7/1973 | Andersen | 363/56 |
| 4,195,333 | 3/1980 | Hedel | 363/21 |

OTHER PUBLICATIONS

A. I. Pressman, "Switching and Linear Power Supply, Power Converter Design", published 1977, paragraph 8.7.1., pp. 259–262.

*Primary Examiner*—William M. Shoop
*Assistant Examiner*—Peter S. Wong
*Attorney, Agent, or Firm*—William Freedman; John P. McMahon

[57] ABSTRACT

A D.C. to D.C. converter is disclosed which includes a first and a fourth, and a second and a third, sequentially operating transistors. The D.C. to D.C. converter further includes a saturable transformer having a center-tap and resistive networks interposed among the four transistors. The D.C. to D.C. converter is adapted for energization by an input D.C. voltage. The transistors of the D.C. to D.C. converter cause one side of the input D.C. voltage to be sequentially applied to opposite sides of a primary winding of the transformer which, in turn, cause the transformer to be sequentially excited into positive and then negative saturation conditions. The sequential excitation of transformer develops a time varying square-wave type signal at the secondary windings of the transformer which is further converted into a D.C. signal by an A.C. to D.C. converter. The third and the fourth transistors are provided to inhibit simultaneous conduction between the first and the second transistors as a saturable transformer is excited into its positive and its negative saturation conditions.

6 Claims, 6 Drawing Figures

D.C. TO D.C. CONVERTER

BACKGROUND OF THE INVENTION

This invention relates to D.C. to D.C. converters, and more particularly, to a D.C. to D.C. converter having means to prevent simultaneous conduction of its power switching transistors.

A D.C. to D.C. voltage converter is normally used to convert a D.C. power input at one voltage level to a D.C. power output at a different voltage level. The D.C. isolation between the input and output power signals is normally provided by a saturable transformer. Power switching transistors are typically provided to sequentially drive a core of a saturable transformer into its positive and negative saturation conditions, thereby developing a square-wave time varying signal which is further rectified into a D.C. signal. The control circuit for the power switching transistor is typically arranged across a secondary or base winding of the transformer and operates upon the collapse of the inductive state of the transformer near the saturation conditions to sequentially turn-on and turn-off the conductive states of the transistors. Due to the high current switching of the power transistors it is desirable that the power transistors not be simultaneously conductive. This problem is addressed by A. I. Pressman, in a textbook published in 1977 by Hayden Book Company, Inc., Rochelle Park, N.J., entitled, "Switching and Linear Power Supply, Power Converter Design", in paragraph 8.7.1. Pressman describes two solutions to the simultaneous conduction of the power switching transistors, both related to the development of the turn-on signal for the transistors. The first solution uses an RC delay for developing the turn-on signal and the second solution uses monostable and logic gate delay for developing the turn-on signal. Either of these solutions requires knowledge of the storage time of the power transistor in order to determine the desired delay. Also the storage time of the power transistor is a function, in part, of load current and junction temperature both of which are variable quantities. It is considered desirable to automatically provide means for inhibiting simultaneous conduction that does not depend on variable quantities.

The simultaneous conduction of the power switching transistors is also described in U.S. Pat. No. 4,195,333 issued to K. K. Hedel on Mar. 25, 1980 and assigned to the same assignee of the present invention. In the U.S. Pat. No. 4,195,333 a synchronous circuit utilizing a two-phase oscillator provides clock signals which inhibit simultaneous conduction of the switching transistors. It is considered desirable to inhibit simultaneous conduction of the power switching without the need of a synchronous type of circuit.

Accordingly, it is an object of the present invention to provide a D.C. to D.C. converter not dependent on a variable quantity or requiring clocking signals to prevent simultaneous conduction of power switching transistors used to control the excitation of a saturable transformer.

It is a further object of the present invention to provide a D.C. to D.C. voltage converter which reduces the peak amplitude of the saturation current within the switching transistors.

It is a still further object of the present invention to inhibit simultaneous conduction of power transistors and thereby reduce power losses of the power transistors.

These and other objects of the invention will become apparent to those skilled in the art upon consideration of the following description of the invention.

SUMMARY OF THE INVENTION

The present invention is directed to a D.C. to D.C. converter having means for inhibiting simultaneous conduction of its power switching transistors. In accordance with one of the preferred embodiments of the invention, a D.C. to D.C. converter adapted for energization by a first D.C. voltage present between a positive and negative potential is provided. The positive potential is connected to a center-tap of a primary winding of a saturable transformer. The saturable transformer has a core with a substantially square magnetic hysteresis loop characteristic. The negative potential is connected to a first and a second transistor. The first and a second transistor sequentially operate to couple the negative potential to opposite ends of the primary winding causing the core of the saturable transformer to be sequentially excited into its positive and negative saturation conditions. The first and second transistor are controlled by a base current control circuit arranged across a first secondary winding of the saturable transformer. The first secondary winding has a voltage potential which experiences a rapid reversal as the transformer is excited into its negative and positive saturation conditions. This rapid reversal causes the base drive circuit to sequentially render conductive and non-conductive the states of the first and second transistors. The sequential conduction of the first and second transistors causes the transformer to be sequentially driven into its saturation conditions which in turn develops a time varying signal at a second secondary winding of the transformer which is rectified by an A.C. to D.C. rectifier to develop a second D.C. voltage. The D.C. to D.C. converter further comprises a third transistor and a fourth transistor. The third transistor is interposed between the first and the second transistor having its collector electrode connected to the base of the first transistor and its base electrode connected by a first means to an emitter electrode of the second transistor. The first means further comprises means responsive to the sequential conduction of the second transistor for causing the third transistor to inhibit conduction of the first transistor. The fourth transistor is interposed between the second and the first transistor having its collector electrode connected to the base of the second transistor and its base electrode connected by a second means to an emitter of the first transistor. The second means further comprises means responsive to the sequential conduction of the first transistor for causing the fourth transistor to inhibit conduction of the second transistor. The arrangement of the first, second, third and fourth transistor inhibit simultaneous conduction of the first and second transistors and thereby reduces the commutational losses of the first and second transistors.

The features of the invention believed to be novel are set forth with particularlity in the appended claims. The invention, itself, however, both as to its organization and operation, together with further objects and advantages thereof, may best be understood by reference to the following description taken in conjunction with the accompanying drawings.

DETAILED DESCRIPTION OF THE PREFERRED EMBODIMENT

Figure 1:
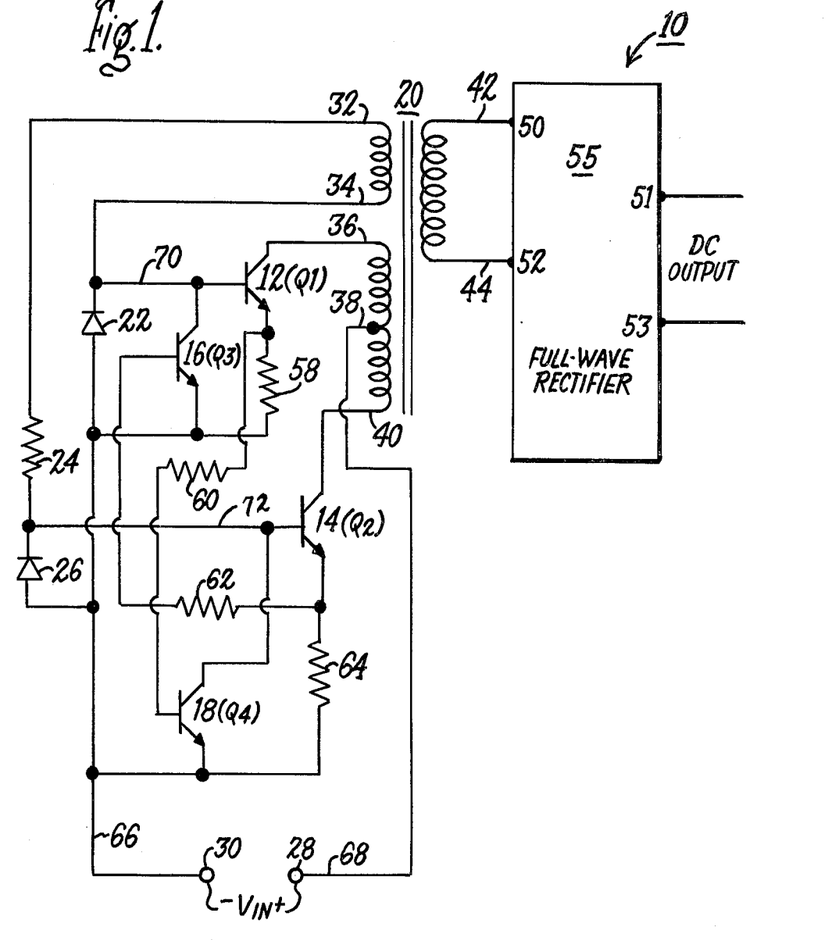
FIG. 1 is a circuit diagram of one embodiment of the present invention.

FIG. 1 shows a circuit arrangement 10 in accordance with a preferred embodiment of the present invention. Circuit arrangement 10 is mainly comprised of a saturable transformer 20, a first transistor 12 (Q1), a second transistor 14 (Q2), a third transistor 16 (Q3), a fourth transistor 18 (Q4) and a full-wave rectifier 55.

Saturation transformer 20 is a conventional type having a core with a substantially square magnetic hysteresis loop characteristic which determines the operating frequency of the D.C. to D.C. converter 10. The core of transformer 20 is commonly a ferrite material. Transformers of this type are available from TOROTEL INC., Grandview, Mo., 64030, as their TC series.

Saturable transformer 20 has a first secondary or base winding having a first end 32 and a second end 34, a primary winding having a center-tap 38 and a first end 36 and a second end 40, and a second secondary winding having a first end 42 and a second end 44. The ends 42 and 44 of the secondary winding are connected to inputs 50 and 52, respectively, of the full wave rectifier 55. Full-wave rectifier 55 operates in a well known manner to convert a time varying signal that may be present at the second secondary winding of the transformer 20 into a d.c. voltage across its outputs 51 and 53. Full-wave rectifier 55 is not considered part of the inventive concept of this embodiment and therefore will not be discussed in detail.

The input to the D.C. to D.C. converter 10 is a D.C. voltage potential $V_{IN}$ having a positive and a negative potential which are connected to terminals 28 and 30 respectively. The positive potential applied to terminal 28 is connected to the center-tap 38 of the saturable transformer 20 via conductor 68. The negative potential applied to terminal 30 is interconnected to the various components within the circuit arrangement 10 via a power buss 66.

The first transistor 12 (Q1) has its collector connected to the side 36 of the primary winding. The base of transistor 12 (Q1) is connected to the side 34 of the base winding via a signal path 70. The emitter of transistor 12 (Q1) is connected to the base of transistor 18 (Q4) via a first means for coupling provided by a current sensing arrangement of resistors 58 and 60. Resistor 58 has one of its ends connected to the buss 66 and its other end connected to the emitter of transistor 12 (Q1). Resistor 60 has one end connected to the emitter of transistor 12 (Q1) and its other end connected to the base of transistor 18 (Q4).

The second transistor 14 (Q2) has its collector connected to the side 40 of the primary winding. The base of transistor 14 (Q2) is connected to the side 32 of the base winding via a signal path 72 and a resistor 24. The emitter of the transistor 14 (Q2) is coupled to the base of the third transistor 16 (Q3) via a second means for coupling provided by a current sensing arrangement of resistors 62 and 64. Resistor 64 has one of its ends connected to buss 66 and its other end connected to the emitter of transistor 14 (Q2). Resistor 62 has one end connected to the emitter of transistor 14 (Q2) and its other end connected to the base of transistor 16 (Q3).

The third transistor 16 (Q3) has its collector connected to the base of transistor 12 (Q1), its emitter connected to the buss 66 and its base connected to the emitter of transistor 14 (Q2) via the resistor 62.

The fourth transistor 18 (Q4) has its collector connected to the base of transistor 14 (Q2), its emitter connected to the buss 66, and its base connected to the emitter of transistor 12 (Q1) via the resistor 60.

The sides 32 and 34 of the secondary winding of transformer 20 are connected to the buss 66 via a diode 22 and serially arranged resistor 24 and diode 26 respectively. The diode 22 has its cathode connected to the side 34 and its anode connected to the buss 66. The diode 26 has its cathode connected to one side of resistor 24 and its anode connected to the buss 66.

In general, D.C. to D.C. converter 10 accepts a D.C. signal $V_{IN}$ and converts the D.C. signal to an A.C. signal at its second secondary winding where it is further rectified by full-wave rectifier 55 to produce a D.C. output across terminals 51 and 53. The D.C. to D.C. converter 10 has a circuit arrangement shown which inhibits simultaneous conduction of its main power switching transistors 12 and 14 occurring during the saturation conditions of the transformer 20. In order to more fully appreciate the circuit arrangement 10, reference is made to a prior art D.C. to D.C. converter 110 shown in FIG. 3.

Figure 3:
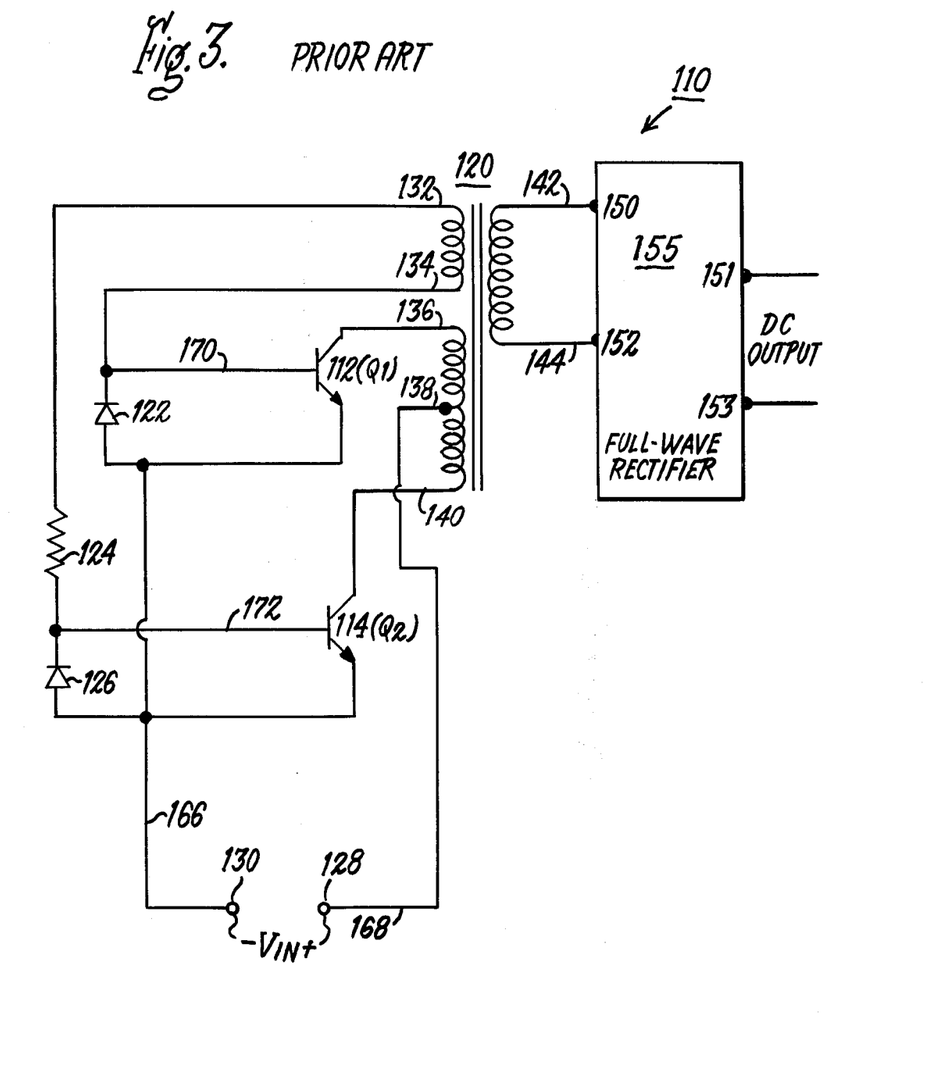
FIG. 3 is a circuit diagram of a conventional arrangement of power switching transistors and a saturable transformer of a D.C. to D.C. converter.

The D.C. to D.C. converter 110 has circuit components 112, 114, 122, 124, 126, and a saturable transformer 120 similar to circuit components 12, 14, 22, 24 and 26, respectively, as described for the D.C. to D.C. converter 10. A problem inherent in the D.C. to D.C. converter 110 is that the power switching transistors 112 and 114 have a period of simultaneous conduction. In order to more clearly describe the simultaneous conduction of transistors 112 and 114 reference is made to FIG. 4.

Figure 4:
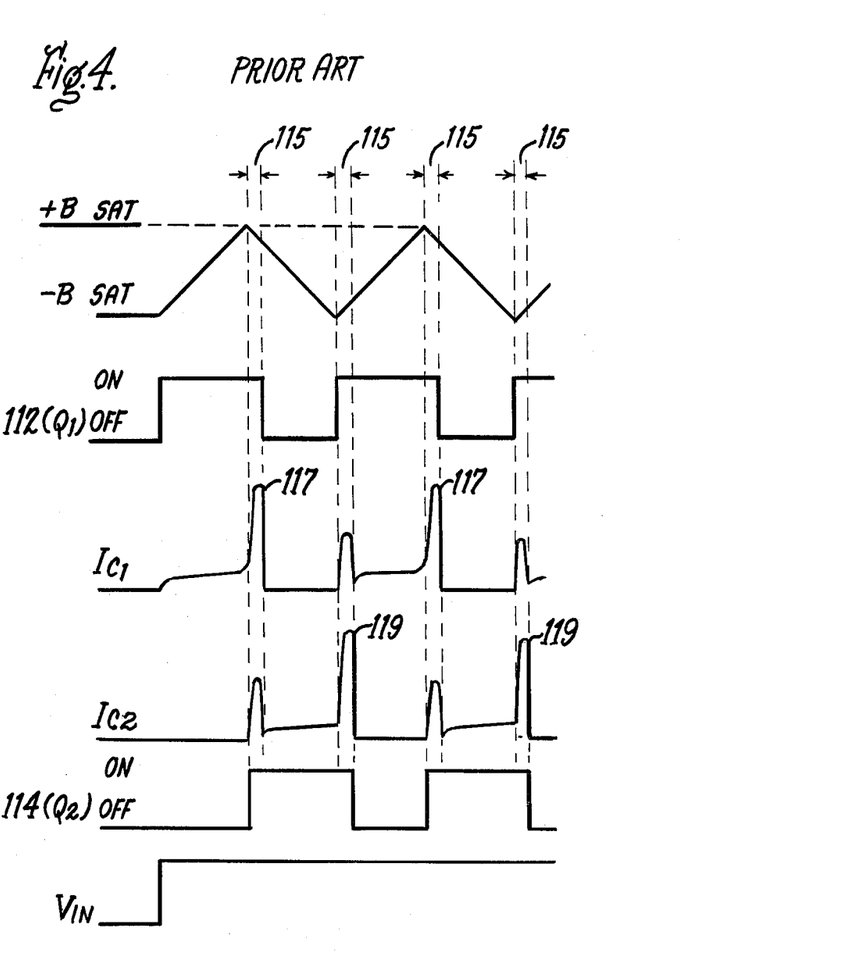
FIG. 4 is a timing diagram for the circuit of FIG. 3.

FIG. 4 shows a timing diagram for the D.C. to D.C. converter 110. The application of a D.C. signal $V_{IN}$, via terminals 128 and 130, causes transistor 112 to be conductive. Conduction of transistor 112 causes its collector current $I_{C1}$ to increase in amplitude as shown in FIG. 4. The increase in current causes the core of the saturable transformer 120 to be excited or driven from its negative saturation condition ($-B$ SAT) toward its positive saturation condition ($+B$ SAT) as shown in FIG. 4. As the saturable transformer approaches its positive saturation condition the inductance of the transformer rapidly decreases or collapses toward zero. This sudden collapse in inductance is sensed by the bias circuits of the D.C. to D.C. converter 110 to render transistor 112 non-conductive and to render transistor 114 conductive. Transistor 114 will conduct or turn-on rapidly but transistor 112 will continue to conduct due to a storage phenomena within the transistor 112. Therefore, transistors 112 and 114 have an overlap period, shown as 115 in FIG. 4, in which both transistors 112 and 114 are simultaneously conductive. FIG. 4 shows this simultaneous conduction period 115 as occurring as the saturable transformer is driven into its positive saturation condition (+B SAT), and also as the saturable transformer is driven into its negative saturation condition (−B SAT). As discussed in the "Background" section, simultaneous conduction of power switching transistors waste power and create excessive peak current and heat which may damage the transistor. As further discussed in the "Background" section, it is desirable to prevent simultaneous conduction without dependence on inherent variable quantities of the power switching devices or without the employment of external means such as clocking pulses to prevent simultaneous conduction. The undesirable simultaneous conduction of the power switching transistors is prevented by the circuit arrangement 10 of the present invention shown in FIG. 1 which, as will be explained, utilize the transistor switching devices themselves to automatically inhibit simultaneous conduction.

Circuit arrangement 10 utilizes two transistors 16 (Q3) and 18 (Q4) to prevent or inhibit simultaneous conduction of transistors 12 (Q1) and 14 (Q2). Transistors 12, 18 and 14 are interconnected such that if transistor 12 is conductive, transistors 12 and 18 develop a control current which inhibits the conduction of transistor 14. Similarly, transistors 14, 16 and 12 are interconnected such that if transistor 14 is conductive transistors 14 and 16 develop a control current which inhibits conduction of transistor 12.

The amount of control current which inhibits conduction of transistor 14 (Q2) during the conduction of transistor 12 (Q1) is determined by the selection of the resistive value of the current sensing network formed by resistors 58 and 60. The control current which inhibits conduction of transistor 14 (Q2) is developed as follows: (1) conduction of transistor 12 (Q1) causes a voltage drop across its emitter resistor 58 to render conductive transistor 18 via resistor 60; (2) conduction of transistor 18 maintains the base of transistor 14 (Q2) at a negative buss potential, via buss 66, to thereby inhibit conduction of transistor 14 (Q2). Similarly, the amount of control current which inhibits the conduction of transistor 12 (Q1) during the conduction of transistor 14 (Q2) is determined by the selection of the resistive values of the current sensing network formed by resistors 62 and 64. The control current which inhibits conduction of transistor 12 (Q1) is developed as follows: (1) conduction of transistor 14 (Q2) causes a voltage drop across its emitter resistor 64 to render conductive transistor 16 via resistor 62; (2) conduction of transistor 16 maintain the base of transistor 12 (Q1) at a negative buss potential, via buss 66, to thereby inhibit conduction of transistor 12 (Q1). To more fully describe the operation of the four interconnected transistors 12, 14, 16 and 18 reference is made to FIG. 5.

Figure 5:
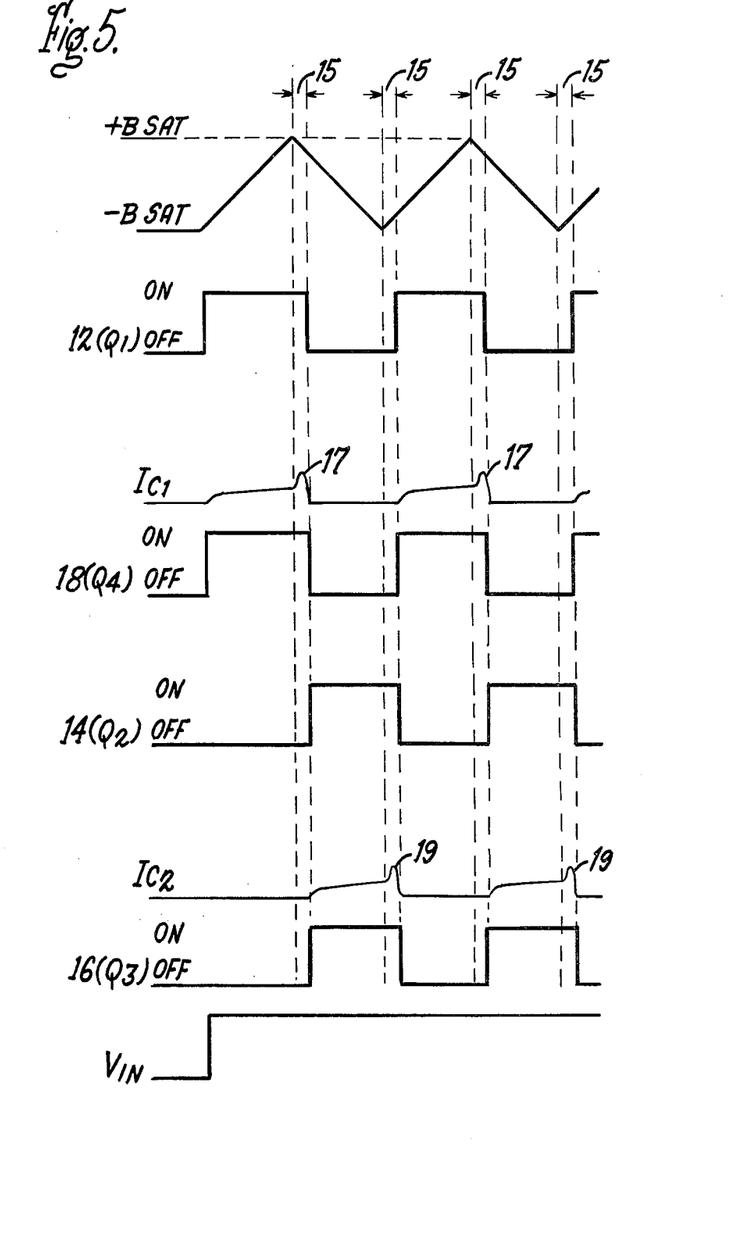
FIG. 5 is a timing diagram for the circuit shown in FIG. 1.

FIG. 5 shows a timing diagram similar to the previously discussed timing diagram, FIG. 4, of the prior art converter 110. However, review of FIG. 5 reveals that the conductive states of transistors 12 (Q1) and 14 (Q2) are non-overlapping. During the time period when transistor 12 (Q1) is rendered conductive it causes its collector current $I_{C1}$ to rise, as shown in FIG. 5, which correspondingly excites transformer 20 from its −B SAT condition into its +B SAT condition. Also, the conduction of transistor 12 causes transistor 18 (Q4) to be rendered conductive which in turn inhibits the conduction of transistor 14 (Q2). Transistor 18 (Q4) maintains transistor 14 (Q2) in its non-conductive state until transistor 12 (Q1) ceases to be conductive. Transistor 14 (Q2) is allowed to conduct upon the removal of the inhibit signal developed by transistor 18 (Q4) and the collector current $I_{C2}$, related to transistor 14, rises to excite transformer 20 from its +B SAT condition into its −B SAT condition. Transistor 14 (Q2) causes transistor 16 (Q3) to be conductive which in turn inhibits conduction of transistor Q1 until transistor 14 (Q2) is turned off. Thus, it should be appreciated that the power switching transistors 12, (Q1) and 14 (Q2) do not have simultaneous conduction states.

It should be noted from a comparison between FIG. 4 and FIG. 5 that the maximum peaks 17 and 19 (FIG. 5) of collector currents $I_{C1}$ and $I_{C2}$ of transistors 12 and 14, respectively, are substantially less than that of the peaks 117 and 119 (FIG. 4) of the collector currents $I_{C1}$ and $I_{C2}$ of transistors 112 and 114 of D.C. to D.C. converter 110. Another embodiment of the present invention that also prevents simultaneous conduction of the switching transistor and reduces the peak values of the collector currents is provided for by the circuit arrangement 90 shown in FIG. 2.

Figure 2:
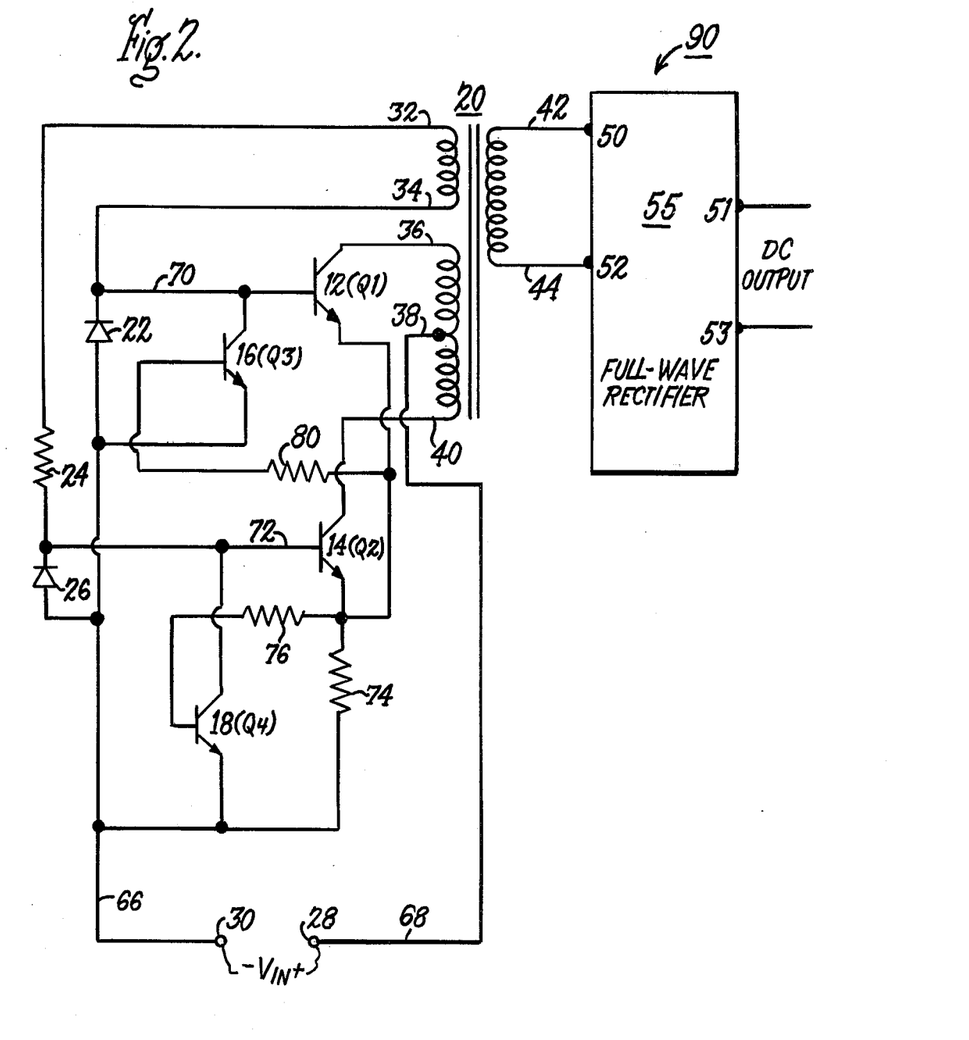
FIG. 2 is a circuit diagram of another embodiment of the present invention.

Circuit arrangement 90 is similar to the previously described circuit arrangement 10 shown in FIG. 1 except that an emitter resistor 74, common to transistors 12 and 14, is primarily used to provide the interrelationship between transistors 12 and 14. Also, the bias arrangements of transistors 16 (Q3) and 18 (Q4) have been modified. The base of transistor 16 is coupled to both emitters of transistors 12 and 14 via a resistor 80. Similarly, the base of transistor 18 is coupled to both emitters of transistors 12 and 14 via a resistor 76.

In general, the operation of circuit 90 is such that when the collector current of either transistor 12 or transistor 14 rises to a predetermined value the voltage drop across the common emitter resistor 74 in conjunction with the voltage drops across resistors 80 and 76 render transistors 16 (Q3) and 18 (Q4) conductive. The predetermined value which cause conduction of transistors 16 and 18 is determined by the resistive values selected for resistors 74, 76, and 80. The resistive values of resistors 74, 76 and 80 are selected such that both transistors 16 and 18 are rendered conductive when the collector current of either transistor 12 (Q1) or transistor 14 (Q2), approaches a value which places the transformer into its positive +B SAT or its negative −B SAT saturation condition. Reference is now made to a timing diagram of FIG. 6 to more fully describe the operation of circuit arrangement 90.

Figure 6:
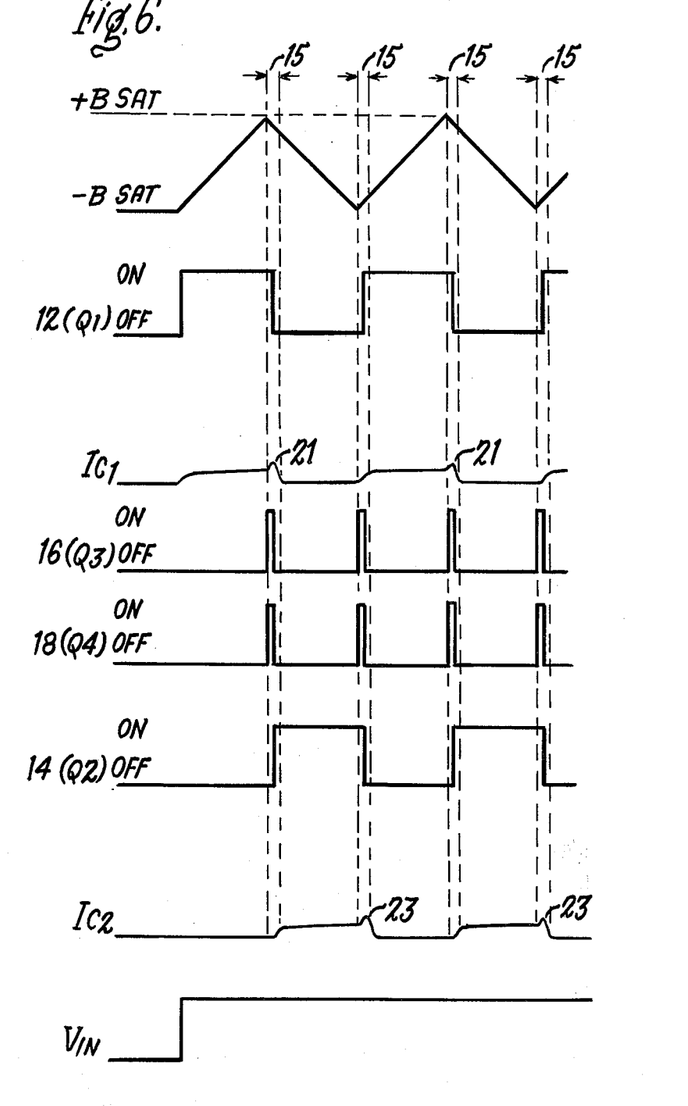
FIG. 6 is a timing diagram for the circuit shown in FIG. 2.

FIG. 6 is similar to the previously described FIG. 5 except that transistors 16 (Q3) and 18 (Q4) are rendered conductive by either transistor 12 (Q1) or transistor 14 (Q2). For example, when transistor 12 (Q1) is conductive it causes its collector current $I_{C1}$ to increase as shown in FIG. 6. As the collector current $I_{C1}$ approaches the +B SAT condition of the saturable transformer, both transistors 16 (Q3) and 18 (Q4) are rendered conductive. The peak value of the collector current $I_{C1}$ for transistor 12 is shown as a point 21. Conduction of transistor 16 (Q3) in turn initiates transistor 12 (Q1) to be rendered non-conductive. Conduction of transistor 18 (Q4) inhibits the conduction of transistor 14 (Q2). When the collector current of transistor 12 (Q1) drops below a predetermined value, which, as previously discussed is determined by the resistive values of resistors 74, 76 and 80, transistors 16 (Q3) and 18 (Q4) are rendered non-conductive and transistor 14 is allowed to conduct. Transistor 14 (Q2) operates with transistors 16 (Q3) and 18 (Q4) in a similar manner as described for transistor 12 (Q1). The peak value of the collector current $I_{C2}$ of transistor 14 is shown as a point 23. A comparison between FIG. 6 and FIG. 4 reveals that the peak currents 21 and 23 of circuit 90 are reduced relative to the peak currents 117 and 119 of circuit 110.

The advantages of the circuit 90 are: (1) the power transistors Q1 and Q2 are not allowed to simultaneously conduct and, (2) the peak current of the transistors 12 and 14 is reduced by the rapid conduction and non-conduction of transistors 16 and 18.

Although the D.C. to D.C. converters 10 and 90 have been described using NPN type transistors it would be apparent to those skilled in the art that PNP type transistors may be used with appropriate polarity reversals in the circuit.

It should now be appreciated that the circuit arrangements 10 and 90 provide a D.C. to D.C. converter which eliminates the simultaneous conduction of its power switching transistors. Furthermore, the circuit arrangements 10 and 90 reduce the power consumption of the power transistors by reducing the peak values of the collector currents.

While the invention has been particularly shown and described with reference to several preferred embodiments thereof, it will be understood by those skilled in the art that various changes in form and detail may be made without departing from the true spirit, and scope of the invention as defined by the appended claims.

What is claimed is:

1. In a D.C. to D.C. voltage converter adapted for energization by a first D.C. voltage present between a positive and negative potential, said positive potential being connected to a center-tap of a primary winding of a saturable transformer, said saturable transformer having a core with a substantially square magnetic hysteresis loop characteristic, said negative potential being connected to a first and a second transistor which sequentially operate to couple said negative potential to opposite ends of said primary winding causing the core of the saturable transformer to be sequentially excited into its positive and its negative saturation conditions, said first and second transistors being controlled by a base drive circuit arranged across a first secondary winding of said saturable transformer having a voltage potential which experiences a rapid reversal as the transformer is excited into its negative and positive saturation conditions, said rapid reversal causing the base drive circuit to sequentially render conductive and non-conductive the states of the first and the second transistors, said sequential conduction of said first and second transistors causing said transformer to be sequentially driven into its saturation conditions which in turn develops a time varying signal at a second secondary winding of said transformer which is rectified by an A.C. to D.C. rectifier to develop a second D.C. voltage, said D.C. to D.C. voltage converter further comprising:

a third transistor interposed between said first and second transistor having its collector electrode connected to a base electrode of said first transistor and its base electrode coupled by a first means to an emitter electrode of said second transistor independently of said saturable transformer, and means comprising said first means responsive to the conduction of said second transistor for causing said third transistor to inhibit conduction of said first transistor, a fourth transistor interposed between said second and first transistor having its collector electrode connected to a base electrode of said second transistor and having its base electrode coupled by a second means to said emitter electrode of said first transistor independently of said saturable transformer, and means comprising said second means responsive to the conduction of said first transistor for causing said fourth transistor to inhibit conduction of said second transistor, said arrangement of said first, second, third and fourth transistors inhibit simultaneous conduction of said first and second transistors and thereby reduces the commutational losses of said first and second transistors.

2. A D.C. to D.C. converter according to claim 1 wherein said first and second means for coupling said base electrodes of said third and fourth transistors, respectively, to said emitter electrodes of said second and first transistors, respectively, comprise:

a current sensing network comprising a first and a second resistor, said first resistor having a first end connected to said negative potential of said first D.C. voltage and its second end connected to its respective emitter electrode of said first or said second transistor, said second resistor having a first end connected to its respective said emitter electrode of said first or said second transistor and its second end respectively connected to said base electrode of said fourth or said third transistor, whereby a selection of resistive values of said first and said second resistor establishes a bias voltage at said base of said third or said fourth transistor that respectively renders said third or said fourth transistor conductive upon conduction of said second or said first transistor.

3. A D.C. to D.C. converter according to claim 1 wherein an arrangement of said first, second, third and fourth transistors comprises:

said first and said second transistor having their emitter electrodes connected to a first end of a first resistor, said first resistor having its second end connected to said negative potential of said first D.C. voltage;

said third transistor having its collector electrode connected to a base electrode of said first transistor, its emitter electrode connected to said negative potential of said first D.C. voltage, and its base electrode connected to one end of a second resistor, said second resistor having its other end connected to said first end of said first resistor;

said fourth transistor having its collector connected to a base electrode of said second transistor, its emitter electrode connected to said negative potential of said first D.C. voltage and its base electrode connected to one end of a third resistor, said third resistor having its other end connected to said first end of said first resistor;

said first, second, and third resistors having resistive values selected such that said third and said fourth transistor are rendered conductive as said saturable transformer is driven near saturation, whereby said third and said fourth transistor provide paths to limit the peak current in the conducting transistor and to inhibit the conduction of the non-conducting transistor;

said arrangement of said first, second, third and fourth transistors inhibit simultaneous conduction of said first and second transistors and thereby reduces the commutational losses of said first and second transistors.

4. In a D.C. to D.C. voltage converter adapted for energization by a first D.C. voltage present between a positive and negative potential, said negative potential being connected to a center-tap of a primary winding of a saturable transformer, said saturable transformer having a core with a substantially square magnetic hysteresis loop characteristic, said positive potential being connected to a first and a second transistor which sequentially operate to couple said positive potential to opposite ends of said primary winding causing the core of the saturable transformer to be sequentially excited into its positive and its negative saturation conditions, said first and second transistors being controlled by a base drive circuit arranged across a first secondary winding of said saturable transformer having a voltage potential which experiences a rapid reversal as the transformer is excited into its negative and positive saturation conditions, said rapid reversal causing the base drive circuit to sequentially render conductive and non-conductive the states of the first and the second transistors, said sequential conduction of said first and second transistors causing said transformer to be sequentially driven into its saturation conditions which in turn develops a time varying signal at a second secondary winding of said transformer which is rectified by an A.C. to D.C. rectifier to develop a second D.C. voltage, said D.C. to D.C. voltage converter further comprising:
  a third transistor interposed between said first and second transistor having its collector electrode connected to a base electrode of said first transistor and its base electrode coupled by a first means to an emitter electrode of said second transistor independently of said saturable transformer, and means comprising said first means responsive to the conduction of said second transistor for causing said third transistor to inhibit conduction of said first transistor,
  a fourth transistor interposed between said second and first transistor having its collector electrode connected to a base electrode of said second transistor and having its base electrode coupled by a second means to said emitter electrode of said first transistor independently of said saturable transformer, and means comprising said second means responsive to the conduction of said first transistor for causing said fourth transistor to inhibit conduction of said second transistor,
  said arrangement of said first, second, third and fourth transistors inhibits simultaneous conduction of said first and second transistors and thereby reduces the commutational losses of said first and second transistors.

5. A D.C. to D.C. converter according to claim 4 wherein said first and second means, for coupling said base electrodes of said third and fourth transistors, respectively, to said emitter electrodes of said second and first transistors, respectively, comprise:
  a current sensing network comprising a first and a second resistor, said first resistor having a first end connected to said positive potential of said first D.C. voltage and its second end connected to its respective emitter electrode of said first or said second transistor, said second resistor having a first end connected to its respective said emitter electrode of said first or said second transistor and its second end respectively connected to said base electrode of said fourth or said third transistor, whereby a selection of resistive values of said first and said second resistor establishes a bias voltage at said base of said third or said fourth transistor that respectively renders said third or said fourth transistor conductive upon conduction of said second or said first transistor.

6. A D.C. to D.C. converter according to claim 4 wherein an arrangement of said first, second, third and fourth transistors comprises;
  said first and said second transistor having their emitter electrodes connected to a first end of a first resistor, said first resistor having its second end connected to said positive potential of said first D.C. voltage;
  said third transistor having its collector electrode connected to a base electrode of said first transistor, its emitter electrode connected to said positive potential of said first D.C. voltage, and its base electrode connected to one end of a second resistor, said second resistor having its other end connected to said first end of said first resistor;
  said fourth transistor having its collector connected to a base electrode of said second transistor, its emitter electrode connected to said positive potential of said first D.C. voltage and its base electrode connected to one end of a third resistor, said third resistor having its other end connected to said first end of said first resistor;
  said first, second, and third resistors having resistive values selected such that said third and said fourth transistor are rendered conductive as said saturable transformer is driven near saturation, whereby said third and said fourth transistor provide paths to limit the peak current in the conducting transistor and to inhibit the conduction of the non-conducting transistor;
  said arrangement of said first, second, third and fourth transistors inhibit simultaneous conduction of said first and second transistors and thereby reduces the commutational losses of said first and second transistors.

* * * * *